United States Patent
Oroskar et al.

(10) Patent No.: US 10,548,149 B1
(45) Date of Patent: Jan. 28, 2020

(54) SYSTEMS AND METHODS FOR ALLOCATING RESOURCES TO HIGH POWER CAPABLE WIRELESS DEVICES

(71) Applicant: Sprint Spectrum LP, Overland Park, KS (US)

(72) Inventors: Siddharth Oroskar, Overland Park, KS (US); Jasinder Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 110 days.

(21) Appl. No.: 15/680,673

(22) Filed: Aug. 18, 2017

(51) Int. Cl.
- *H04W 72/10* (2009.01)
- *H04W 72/04* (2009.01)
- *H04W 52/14* (2009.01)
- *H04L 5/00* (2006.01)

(52) U.S. Cl.
CPC ......... *H04W 72/10* (2013.01); *H04W 52/146* (2013.01); *H04W 72/0453* (2013.01); *H04W 72/0493* (2013.01); *H04L 5/0037* (2013.01)

(58) Field of Classification Search
CPC .................................................... H04W 72/10
USPC .......................................... 455/453; 370/329
See application file for complete search history.

(56) References Cited

U.S. PATENT DOCUMENTS

| | | | |
|---|---|---|---|
| 8,447,344 B2 | 5/2013 | Ratasuk et al. | |
| 9,078,220 B2 | 7/2015 | Makhlouf et al. | |
| 2015/0085729 A1* | 3/2015 | Majjigi | H04W 52/12 370/311 |
| 2015/0139073 A1* | 5/2015 | Buchwald | H04W 72/085 370/327 |

* cited by examiner

*Primary Examiner* — Joel Ajayi

(57) ABSTRACT

Systems and methods are described for assigning wireless resources to a high power wireless device. In some embodiments, a quality of service metric used for communication between a wireless device and an access node is identified, wherein the wireless device is configured to transmit an uplink signal at a first signal level that meets a power criteria. Default uplink resource are assigned to the wireless device based on the identified quality of service criteria, wherein the default uplink resources are associated with a default wireless device configured to transmit an uplink signal at a second signal level that does not meet the power criteria. And uplink communication is received at the access node from the wireless device using the assigned default uplink resources.

7 Claims, 7 Drawing Sheets

US 10,548,149 B1

SYSTEMS AND METHODS FOR ALLOCATING RESOURCES TO HIGH POWER CAPABLE WIRELESS DEVICES

TECHNICAL BACKGROUND

As wireless networks evolve and grow, there are ongoing challenges associated with reaching targeted coverage levels. Recently, in an effort to boost coverage and enhance throughput in wireless networks, network operators have proposed deployment of wireless devices capable of transmitting at a maximum allowable transmit power that is higher than a current maximum allowable transmit power of defaults wireless devices and/or other currently deployed low power wireless devices. When portion(s) of the wireless network experience high load (e.g., loading above a threshold), which may stem from large amounts of data traffic and/or poor channel conditions, access node(s) may collect power headroom and other data from the wireless devices; access nodes use the collected data to schedule (or assign) uplink (UL) and/or downlink (DL) wireless resources (i.e., wireless resource grant) for connected wireless devices. However, these wireless devices capable of transmitting at a higher maximum power may not require the additional resources that would be assigned using a conventional scheduler. For example, depending on quality of service requirements for the wireless device, it may be suitable to assigned resources to the high power wireless device as though it were a default wireless device. Accordingly, a channel-aware system that schedules UL wireless resources, while balancing network load, such that high power wireless devices are selectively assigned wireless resources based on quality of service requirements is desirable.

OVERVIEW

Systems and methods are described for assigning wireless resources to a high power wireless device. In some embodiments, a quality of service metric used for communication between a wireless device and an access node is identified, wherein the wireless device is configured to transmit an uplink signal at a first signal level that meets a power criteria. Default uplink resource are assigned to the wireless device based on the identified quality of service criteria, wherein the default uplink resources are associated with a default wireless device configured to transmit an uplink signal at a second signal level that does not meet the power criteria. And uplink communication is received at the access node from the wireless device using the assigned default uplink resources.

DETAILED DESCRIPTION

In an effort to boost coverage and enhance throughput in wireless networks, network operators have proposed deployment of high power wireless devices (e.g., power class 1 or 2 wireless devices, illustrated in Table 1 below) throughout the wireless network alongside default and/or other currently deployed low power wireless devices (e.g., power class 3 or 4 wireless devices, illustrated in Table 1 below). Wireless networks use scheduler(s) to schedule (or assign) uplink (UL) and/or downlink (DL) wireless resources (i.e., wireless resource grants) among connected wireless devices based in part on channel conditions for the wireless devices. In some instances, a high power wireless device will benefit from advantageous uplink channel conditions (when compared to a default wireless device) due to the higher transmit power capability. However, when considering wireless resource efficiency for the network as a whole, it may be suitable to assign the high power wireless device uplink resources as if it were a default wireless device, for instance based on the quality of service conditions required for communication with the wireless device. Thus, a scheduler that considers quality of service metrics when assigning resources to a high power wireless device can enhance the wireless resource efficiency for the network.

Figure 1A:
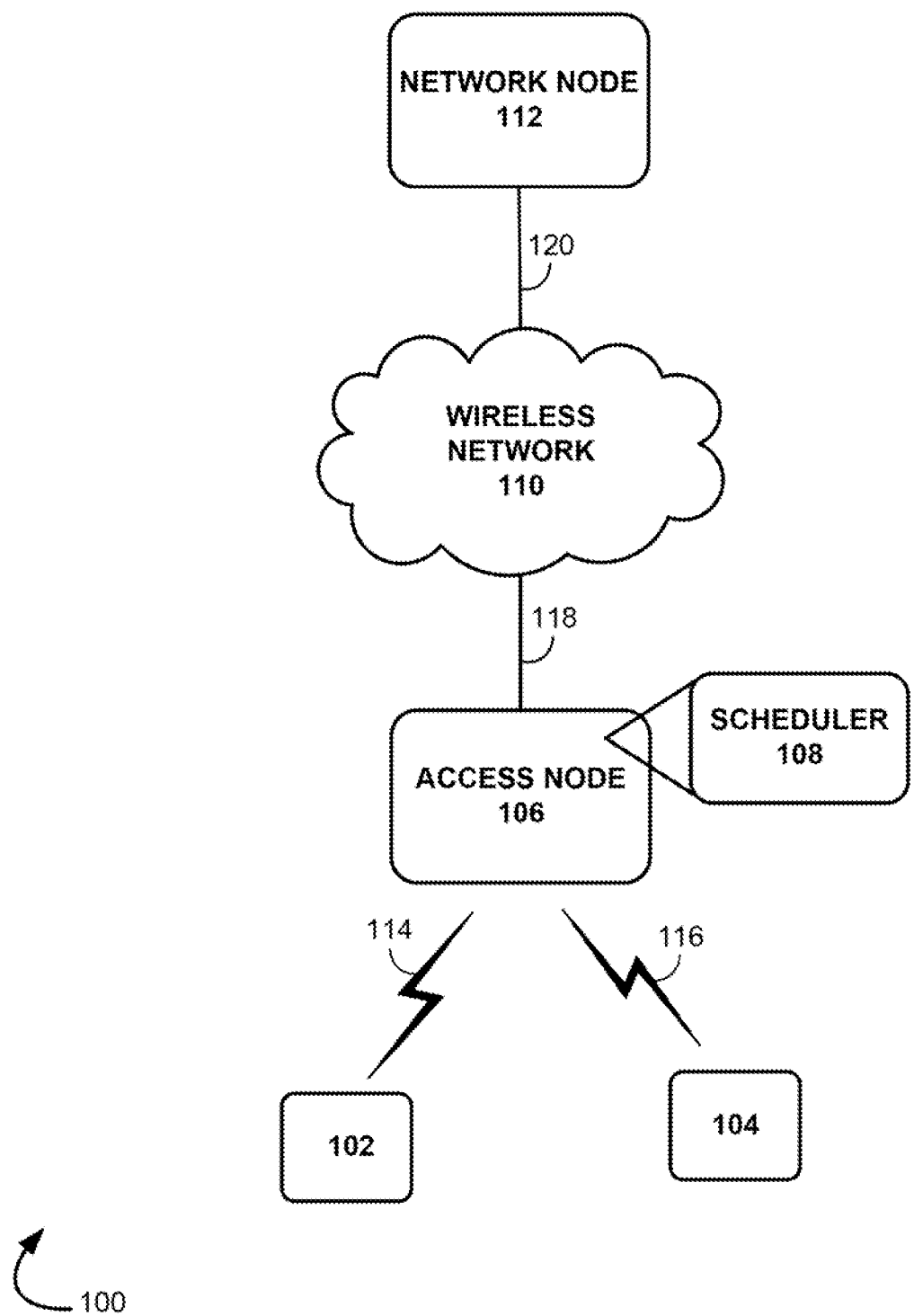
FIG. 1A illustrates an exemplary communication system for scheduling transmissions from an access node in a wireless network.
Figure 1B:
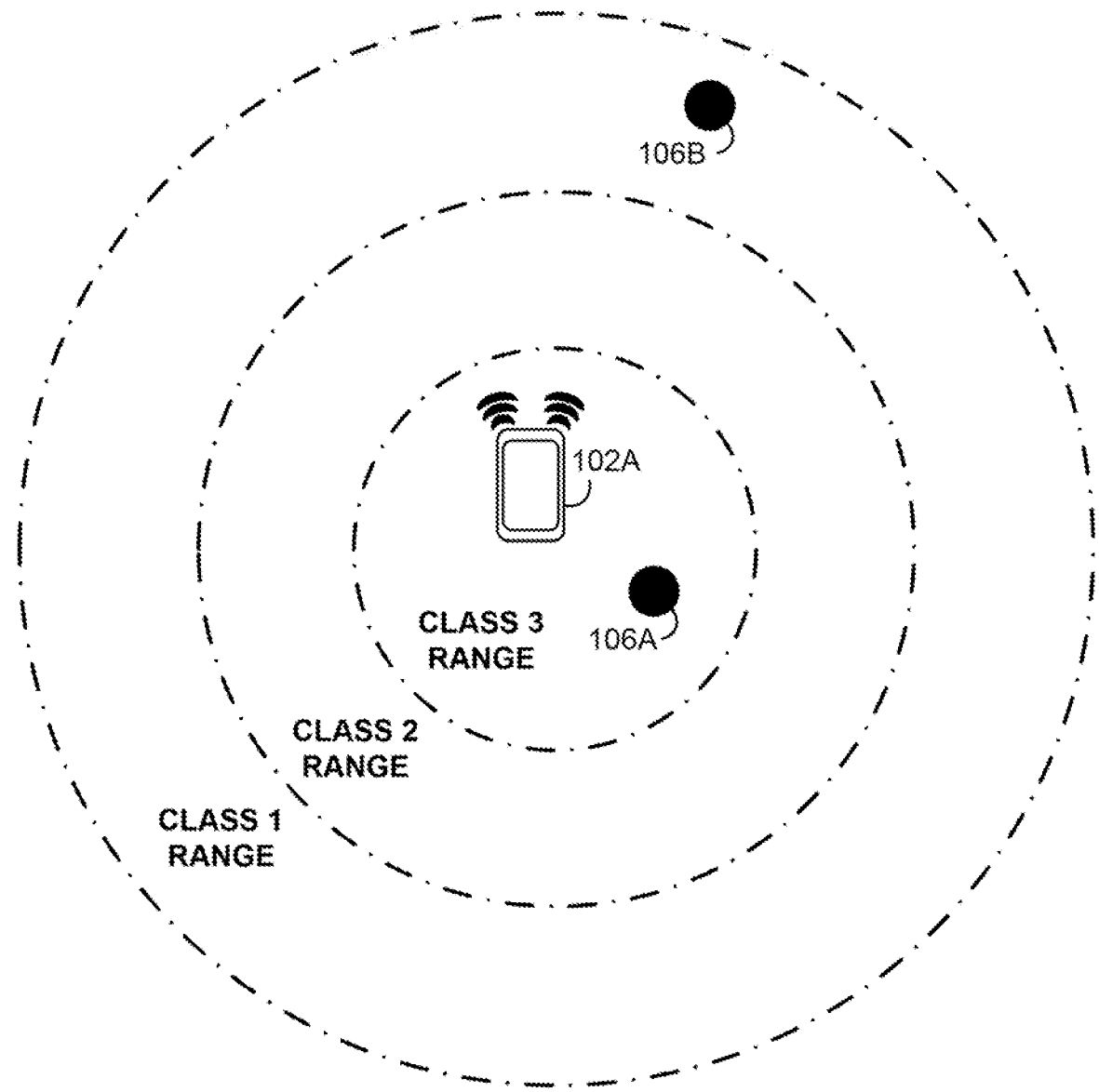
FIG. 1B illustrates exemplary power class range(s) of high power wireless devices and default and/or other currently deployed wireless devices of the exemplary communication system illustrated in FIG. 1A.

FIG. 1A illustrates an exemplary communication system 100 for scheduling (or assigning) UL/DL transmissions to/from an access node in a communication network. FIG. 1B illustrates exemplary power class range(s) of high power wireless devices and default and/or other deployed low power wireless devices of the exemplary communication system 100 illustrated in FIG. 1A. System 100 can comprise high power wireless devices and/or default or other low power wireless devices 102, 102A, 104, access nodes 106, 106A, 106B, scheduler 108, network node 112, and wireless network 110. Access nodes 106, 106A, 106B can further include a data scheduler (not shown). The communications between high power wireless devices and/or low power wireless devices 102, 102A, 104 and access nodes 106, 106A, 106B can be relayed, monitored, inspected, and/or scheduled by an inspection module or node at access nodes 106, 106A, 106B and/or scheduler 108.

Other network elements may be present in the communication system 100 to facilitate communication but are omitted for clarity, such as controller nodes, base stations, base station controllers, gateways, mobile switching centers (MSC), dispatch application processors (DAP), and location registers such as a home location register (HLR) or visitor location register (VLR). Furthermore, other network elements may be present to facilitate communication between high power wireless devices 102, 102A and/or low power wireless devices 104, access nodes 106, 106A, 106B, scheduler 108, wireless network 110, and network node 112, which are omitted for clarity, including additional processing nodes, routers, gateways, and physical and/or wireless data links for carrying data among the various network elements.

As noted above, wireless devices 102, 102A, 104 can be configured as different power class wireless devices and can be any device configured to communicate over system 100 using a wireless communication link or interface. In one embodiment, illustrated in Table 1 below, the maximum allowable transmit power for wireless devices 102, 102A, 104 can be defined by the power class of the wireless device. For example, the maximum allowable transmit power level and tolerance (i.e., power error limits) with which wireless device 102, 102A, 104 can transmit data on a given operating band (e.g., Bands I-III) can be specified based on a pre-defined power class (e.g., power classes 1-4 illustrated in Table 1 below and/or FIG. 1B) of the wireless device 102, 102A, 104 rather than a physical maximum transmit capability of the wireless device 102, 102A, 104 hardware.

In one embodiment, high power wireless devices and/or low power wireless devices can be implemented using Third Generation Partnership Project Long Term Evolution (3GPP LTE) network architecture and/or protocol. For example, off-the-shelf, default, and/or other low power wireless devices or User Equipments (LPUEs) are currently defined in LTE as power class 3 and/or power class 4 wireless devices. Power class 3 and/or power class 4 LPUEs can be configured (in LTE) with a maximum allowable transmit power level of +23 dBm for network operating Bands I-III with a nominal power tolerance of ±2 dB (e.g., for E-UTRA bands). High power class wireless devices or UEs (HPUEs) are currently defined in LTE as power class 1 or power class 2 wireless devices. Power class 1 and/or power class 2 HPUEs can be configured (in LTE) with a maximum allowable transmit power level of +26 dBm for network operating Bands I-II with a nominal power tolerance ±2 dB (e.g., for E-UTRA bands), as illustrated in Table 1. But, one of ordinary skill in the art would recognize that high power wireless devices and/or low power wireless devices are not limited to any specific technology architecture, such as LTE, and can be used with any network architecture and/or protocol.

TABLE 1

| Operating Band | Power Class 1 Wireless Device | | Power Class 2 Wireless Device | | Power Class 3 Wireless Device | | Power Class 4 Wireless Device | |
|---|---|---|---|---|---|---|---|---|
| | Power (dBm) | Tol. (dB) | Power (dBm) | Tol. (dB) | Power (dBm) | Tol. (dB) | Power (dBm) | Tol. (dB) |
| Band I | 31 | ±2 | 26 | ±2 | 23 | ±2 | 21 | ±2 |
| Band II | — | — | 26 | ±2 | 23 | ±2 | 21 | ±2 |
| Band III | — | — | — | — | 23 | ±2 | 21 | ±2 |

Wireless devices 102, 102A, 104 (e.g., configured as either high power wireless devices or low power wireless devices) can include a cell phone, a smart phone, a computing platform such as a laptop, a palmtop, or a tablet, a personal digital assistant (PDA), an internet access device, and combinations thereof. Wireless devices 102, 102A, 104 can transmit and/or receive information over system 100 using various communication services. These services can include various voice, data, and/or MBMS services and applications. For example, mobile voice services, mobile data services, push-to-talk services, internet services, web browsing, email, pictures, picture messaging, video, video messaging, broadcast video, audio, voicemail, music MP3's, ring tones, stock tickers, news alerts, etc.

Access nodes 106, 106A, 106B can include scheduler(s) and can be any network node configured to provide communication between wireless devices 102, 102A, 104 and wireless network 110. Access nodes 106, 106A, 106B can be short range access nodes or standard access nodes. A short range access node could include a microcell base station, a picocell base station, a femtocell base station, relay node, or the like. A standard access node could include base transceiver stations, radio base stations, radio network controllers, an eNodeB device, or an enhanced eNodeB device, a donor eNodeB, or the like. Access nodes 106, 106A, and 106B can use scheduler(s) (e.g., scheduler 108) to schedule or assign wireless resources to wireless devices 102, 102A, 104 using control information carried by an UL/DL control channel.

Scheduler(s) 108 may comprise module(s), software component(s), or computing unit(s) of access nodes 106, 106A, and/or 106B used to schedule wireless resources for wireless devices in communication with the access nodes via control information carried by an UL/DL control channel. In some embodiments, scheduler(s) 108 can collect and store a maximum allowable transmit power (e.g., associated with a defined power class of wireless device 102, 102A, 104) and/or data related to capacity/delay characteristics (e.g., an amount of data buffered per wireless device, a radio frequency (RF) signal quality of the wireless device, buffer delay or period of time from receipt of a last data packet at the wireless device, access node sector throughput, cell-edge wireless device user experience, guaranteed bit rate/non-guaranteed bit rate, backhaul limitations/capacity, wireless device mobility, etc.) of the wireless devices 102, 102A, and 104 reported (or calculated) at the access node. Scheduler(s) 108 can use preset or dynamic scheduling algorithms to schedule wireless resources for wireless devices 102, 102A, and 104. The scheduling algorithm can include, for example, a proportional fairness scheduling algorithm (e.g., low proportional fairness, medium proportional fairness, and high proportional fairness), a data rate scheduling algorithm, and/or a hybrid scheduling algorithm.

Proportional fairness scheduling algorithms are compromise-based scheduling algorithms that attempt to maintain a balance between two competing interests: (i) maximizing a total throughput of the wireless network 110; and (ii) providing wireless devices 102, 102A, 104 with a baseline QoS. In an exemplary embodiment, scheduler(s) 108 can achieve low proportional fairness by using weighted fair queuing (WFQ), which assigns scheduling weights (or factors) to data flows transmitted to/from wireless devices 102, 102A, and 104 based on capacity/delay characteristics and/or a calculated CQI value (e.g., signal-to-noise ratio (SNR), signal-to-interference plus noise ratio (SINR), signal-to-noise plus distortion ratio (SNDR), etc.) or other channel quality metric, etc., reported by wireless devices 102, 102A, 104 at an access nodes 106, 106A, 106B of the wireless network 110; the access nodes 106, 106A, and 106B can track the CQI value or other channel quality metrics using measurement reports from wireless devices 102, 102A, 104, which value(s)/metric(s) can be updated periodically. Scheduler(s) 108, using a low proportional fairness scheduling algorithm, may distribute a greater amount of wireless resources to wireless devices 102, 102A, and 104 reporting, for example, high CQI values and/or high data transmit rates (i.e., scheduler(s) 108 may prefer wireless devices 102, 102A, 104 with "good" RF conditions over those wireless devices 102, 102A, 104 with "poor" RF conditions). Alternatively, scheduler(s) 108 can achieve high proportional fairness through equal distribution of wireless resources (e.g., in a round robin fashion that disregards RF conditions of the wireless devices) among wireless devices 102, 102A, and 104. Scheduler(s) 108 achieve medium proportional fairness by scheduling wireless resources to wireless devices 102, 102A, and 104 using varying degrees of "fairness" to achieve balance between wireless network 110 capacity and throughput to wireless devices 102, 102A, and 104 operating at edges of a radio range of the access node 106, 106A, and 106B.

Data rate scheduling algorithms are "best effort" scheduling algorithms that schedule wireless resources based on a pre-assigned or dynamic scheduling priority of the wireless device 102, 102A, and 104; scheduling priorities can be assigned by scheduler(s) 108 such that wireless devices 102, 102A, and 104 with the least "expensive" data flows or reporting highest capacity/lowest delay characteristics and/or high CQI value(s) or metric(s) are scheduled first for wireless resource grants. Data rate scheduling algorithms typically have low throughput fairness. Hybrid scheduling algorithms use a combination of scheduling criteria (e.g., high QoS, high CQI or other channel quality metric, guaranteed services, proportional fairness, average wireless network throughput, etc.) for prioritizing wireless devices 102, 102A, 104 for wireless resource grants.

Access nodes 106, 106A, 106B and/or scheduler(s) 108 can comprise a processor and associated circuitry to execute or direct the execution of computer-readable instructions to obtain information. Access nodes 106, 106A, 106B and/or scheduler(s) 108 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes 106, 106A, 106B and/or scheduler(s) 108 can receive instructions and other input at a user interface.

Wireless network 110 can be a wired and/or wireless communication network, and can comprise processing nodes, routers, gateways, and physical and/or wireless data links for carrying data among various network elements, including combinations thereof, and can include a local area network (LAN), a wide area network (WAN), and an internetwork (including the Internet). Wireless network 110 can be capable of carrying data, for example, to support voice, push-to-talk, broadcast video, and data communications by a wireless device, for example, wireless devices 102, 102A, 104. Wireless network protocols can comprise Code Division Multiple Access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by wireless network 110 comprise Ethernet, Fast Ethernet, Gigabit Ethernet, Local Talk (such as Carrier Sense multiple Access with Collision Avoidance), Token Ring, Fiber Distributed Data Interface (FDDI), and Asynchronous Transfer Mode (ATM). Wireless network 110 can also comprise additional base stations, controller nodes, telephony switches, internet routers, network gateways, computer systems, communication links, or some other type of communication equipment, and combinations thereof.

Network node 112 can be any network node configured to communicate information and/or control information over system 100. For example, network node 112 can receive and/or transmit information to/from wireless devices 102, 102A, and 104 over system 100. While network node 112 is shown in the backhaul of system 100, network node 112 could alternatively be located between access nodes 106, 106A, 106B and wireless network 110. Network node 112 can be a standalone computing device, computing system, or network component, and can be accessible, for example, by a wired or wireless connection, or through an indirect connection such as through a computer network or wireless network. For example, network node 112 can include a Mobility Management Entity (MME), a Home Subscriber Server (HSS), a Policy Control and Charging Rules Function (PCRF), an Authentication, Authorization, and Accounting (AAA) node, a Rights Management Server (RMS), a Subscriber Provisioning Server (SPS), a policy server, etc. One of ordinary skill in the art would recognize that network node 112 is not limited to any specific technology architecture, such as LTE, and can be used with any network architecture and/or protocol.

Communication links 114, 116, 118, and 120 can be wired or wireless and use various communication protocols such as Internet, Internet Protocol (IP), LAN optical networking, Hybrid Fiber Coax (HFC), telephony, T1, or some other communication format—including combinations, improvements, or variations thereof. Wireless communication links 114, 116, 118, and 120 can be a radio frequency, microwave, infrared, or other similar signal, and can use a suitable communication protocol, for example, GSM, CDMA, WiMAX, LTE, or combinations thereof. Other wireless protocols can also be used. Communication links 114, 116, 118, and 120 can be a direct link or might include various equipment, intermediate components, systems, and networks.

In some embodiments, wireless devices 102 and 104 can be configured as high power wireless device and/or a low or default power wireless devices. Wireless devices 102 and 104 can use power headroom (PHR) and/or enhanced PHR (ePHR) message(s) to report a current transmit power state (e.g., an amount of power the wireless device used to transmit an uplink signal in a previous transmission) to access node 106. Power headroom reporting to access nodes 106 can be periodic and/or event-triggered. Wireless devices 102 and 104 can also report capacity/delay characteristic(s) associated with data flows transmitted to/from the wireless devices 102 and 104 at access node 106.

Scheduler 108 can select (or implement) any suitable scheduling algorithm (e.g., proportional fairness, data rate, or a hybrid). In an embodiment, scheduler 108 can collect and store a maximum allowable transmit power and/or data related to capacity/delay characteristics reported at access node 106. Because scheduler 108 often schedules wireless resources among wireless devices 102 and 104 without regard to (or irrespective of) the current transmit power state of the wireless devices, access node 106 via the scheduler 108 may unduly choose (or favor) a high power wireless device (e.g. wireless device 102) reporting a greater channel quality than a similarly situated low power or default power wireless device (e.g., wireless device 104). That is, access node 106 may unduly favor high power wireless device 102 with a greater current transmit power state for UL resource grant(s) compared to (or over) a low power or default power wireless device 104 reporting (i) a maximum allowable transmit power value that is similar to (or the same as) a maximum allowable transmit power reported at access node 106 by the high power wireless device 102; and/or (ii) capacity/delay characteristics that are similar to (or the same as) capacity/delay characteristics reported at access node 106 by the high power wireless device 102.

However, in some circumstances, wireless device 102 may provide negligible or little enhanced service to a user when receiving favorable treatment from scheduler 108, for instance when the wireless device comprises application requirements that would not substantially benefit from more robust resource grants and/or favorable scheduling. Accordingly, it may be beneficial, when certain network conditions arise, to offset the advantage that high power wireless devices gain from scheduler 108.

Figure 2:
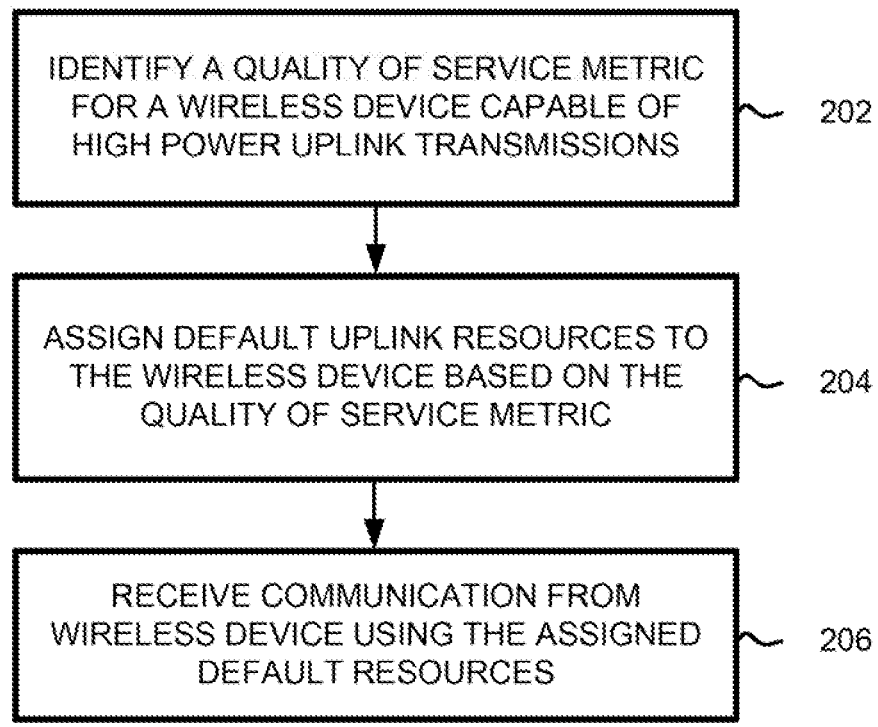
FIG. 2 illustrates an exemplary method for assigning wireless resources to a high power wireless device.

FIG. 2 illustrates an exemplary method for assigning wireless resources for a high power wireless device in a wireless communication network. The method of FIG. 2 will be discussed with reference to the exemplary system 100 illustrated in FIG. 1A and the exemplary power class range(s) of high power wireless devices and default and/or other currently deployed low power wireless devices of the exemplary communication system 100 illustrated in FIG. 1A. But, the exemplary method for scheduling wireless resources illustrated in FIG. 2 can be implemented with any suitable communication system. In addition, although FIG. 2 depicts steps performed in a particular order or arrangement. One skilled in the art, using the disclosure provided herein, will appreciate that various steps of the method can be omitted, rearranged, combined, and/or adapted in various ways.

Referring to FIG. 2, at 202, a quality of service metric used for communication between a wireless device and an access node may be identified, wherein the wireless device is configured to transmit an uplink signal at a first signal level that meets a power criteria. For example, wireless device 102 may comprise a high power wireless device (e.g., device class 1 or 2) such that the wireless device is capable of transmitting a signal (e.g., uplink signal) at a signal level (e.g., 31 dB or 26 dB) that meets a power criteria. In an embodiment, a quality of service metric for the communication between wireless device 102 and access node 106 may be determined (e.g., a quality of service class identifier (QCI)).

At 204, default uplink resources may be assigned to the wireless device based on the identified quality of service criteria, wherein the default uplink resources are associated with a default wireless device configured to transmit an uplink signal at a second signal level that does not meet the power criteria. For example, based on the identified quality of service metric, access node 106 via scheduler 108 may assign uplink wireless resources to wireless device 102 as if the wireless device were a default wireless device that did not have the capability to transmit an uplink signal at a signal level that meets the criteria (e.g., as if the wireless device were a default wireless device, of power class 3 or 4, rather than a high power wireless device, of power class 1 or 2).

In an embodiment, the identified quality of service metric may be compared to a criteria, and the default wireless resources may be assigned based on the comparison. For example, when the identified quality of service metric fails to meet the criteria, a channel quality reported by wireless device 102 may be offset (reduced) such that scheduler 108 assigns uplink resources to the wireless device as if it were a default wireless device (e.g., reporting a lower channel quality).

At 206, uplink communication may be received at the access node from the wireless device using the assigned default uplink resources. For example, wireless device 102 may transmit uplink signals using the assigned default uplink resources, and the signals may be received at access node 106.

Figure 3:
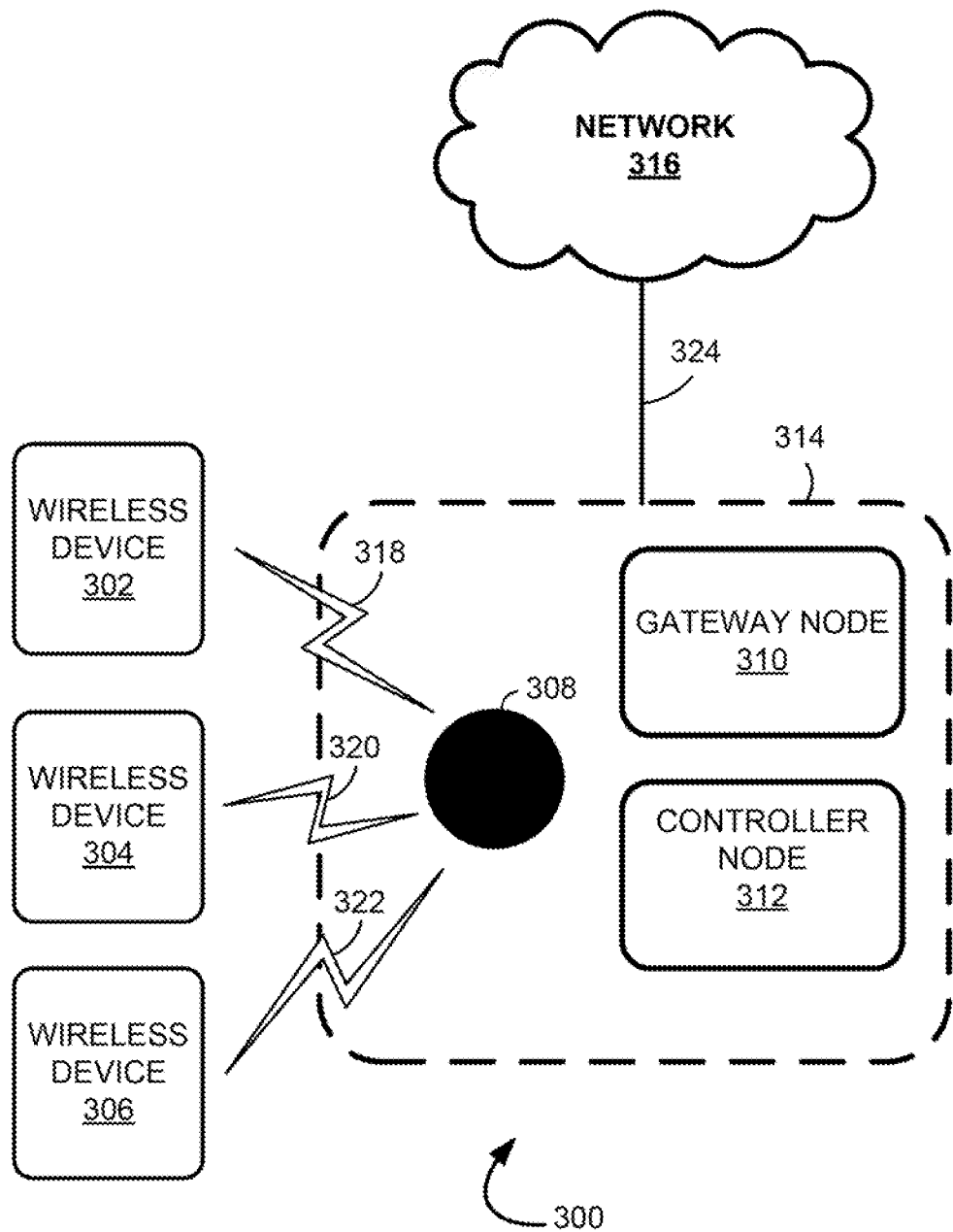
FIG. 3 illustrates another exemplary communication system for scheduling transmissions from an access node in a wireless network.

FIG. 3 illustrates another exemplary communication system 300 for scheduling (or assigning) wireless resources for high power wireless devices. The system 300 will be discussed with reference to the exemplary power class range(s) of high power wireless devices and default and/or other deployed low power wireless devices illustrated in FIG. 1B and exemplary Table 1. System 300 can comprise high power wireless devices and/or default or low power wireless devices 302, 304, and 306, access node 308 (which can include scheduler(s)), gateway node 310, controller node 312, and communication networks 314 and 316. The communications between high power wireless devices or default and/or other deployed low power wireless devices can be relayed, monitored, inspected, and/or scheduled by an inspection module or node at access node 308 and/or a scheduler or scheduler node.

Other network elements may be present in the communication system 300 to facilitate communication but are omitted for clarity, such as controller nodes, base stations, base station controllers, gateways, MSC, DAP, and location registers such as a HLR or VLR. Furthermore, other network elements may be present to facilitate communication between high power wireless devices and/or low power devices 302, 304, and 306, access node 308, etc., and communication networks 314 and 316.

As noted above, wireless devices 302, 304, and 306 can be configured as different power class wireless devices (e.g., high power wireless devices and/or low power wireless devices) and can be any device configured to communicate over system 300 using a wireless communication link or interface. In one embodiment, illustrated in Table 1, the maximum allowable transmit power for wireless devices 302, 304, and 306 can be defined by the power class of the wireless device. For example, the maximum allowable transmit power level and tolerance (i.e., power error limits) with which wireless device 302, 304, and 306 can transmit data on a given operating band (e.g., Bands I-III) can be specified based on a pre-defined power class (e.g., power classes 1-4 illustrated in Table 1 and/or FIG. 1B) of the wireless device 302, 304, and 306 rather than a physical maximum transmit capability of the wireless device 302, 304, and 306 hardware. default and/or other low power wireless devices are currently defined as power class 3 and/or power class 4 wireless devices with a maximum allowable transmit power level of +23 dBm for network operating Bands I-III; high power class wireless devices are currently defined as power class 1 or power class 2 wireless devices with a maximum allowable transmit power level of +26 dBm for network operating Bands I-III, as illustrated in Table 1.

Wireless devices 302, 304, and 306 (e.g., configured as either high power wireless devices or low power wireless devices) can include a cell phone, a smart phone, a computing platform such as a laptop, a palmtop, or a tablet, a PDA, an internet access device, and combinations thereof. A wireless interface of wireless devices 302, 304, and 306 can include one or more transceivers for transmitting and receiving data over system 300. Each transceiver can be associated with the same or different frequency bands, the same or different radio access technologies, the same or different network providers (e.g., wireless networks 314 and 316), and/or the same or different services. For example, wireless devices 302, 304. And 306 can include a transceiver that is associated with one or more of the following: CDMA, GSM, WiMAX, 3GPP LTE, and/or HSPA, IEEE 802.11, WiFi, Bluetooth, Zigbee, IrDA, MBMS, etc.

Wireless devices 302, 304, and 306 can transmit and/or receive information over system 100 using various communication services. These services can include various voice, data, and/or MBMS services and applications. For example, mobile voice services, mobile data services, push-to-talk services, internet services, web browsing, email, pictures, picture messaging, video, video messaging, broadcast video, audio, voicemail, music MP3's, ring tones, stock tickers, news alerts, etc.

Wireless devices 302, 304, and 306 can be connected with access node 308 through communication links 318, 320, and 322. Communication links 318, 320, and 322 can use various communication media, such as air, space, metal, optical fiber, or some other signal propagation path—including combinations thereof. Communication links 318, 320, and 322 may comprise many different signals sharing the same link. Communication links 318, 320, and 322 could include multiple signals operating in a single "airpath" comprising beacon signals, user communications, communication sessions, overhead communications, frequencies, timeslots, transportation ports, logical transportation links, network sockets, packets, or communication directions. For example, user communication between wireless devices 302, 304, and 306, and access node 308 could share the same representative wireless link, but be transferred over different communication sessions, frequencies, timeslots, packets, ports, sockets, logical transport links, or in different directions—including combinations thereof.

Access node 308 can include scheduler(s) and can be any network node configured to provide communication between wireless devices 302, 304, and 306 and wireless networks 314 and 316. Access node 308 can be a short range access node or standard access node. A short range access node could include a microcell base station, a picocell base station, a femtocell base station, relay node, or the like. A standard access node could include base transceiver stations, radio base stations, radio network controllers, an eNodeB device, or an enhanced eNodeB device, a donor eNodeB, or the like. Access node 308 can use scheduler(s) and/or coordinate with a scheduler node to schedule wireless resource to wireless devices 302, 304, and 306 using control information carried by an UUL DL control channel. In some embodiments, the scheduling assignments can include PUSCH resource indication(s), a transport format (e.g., an index of MCS, which may be QPSK, QAM16, QAM64, etc.), hybrid-ARQ information, control information (e.g., related to multiplexing), command for power control of the PUCCH, etc.

Access node 308 can comprise a processor and associated circuitry to execute or direct the execution of computer-readable instructions to obtain information. Access node 308 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access node 308 can receive instructions and other input at a user interface.

Gateway node 310 can be any network node configured to interface with other network nodes using various protocols. Gateway node 310 can communicate user data over system 300. Gateway node 310 can be standalone computing devices, computing systems, or network components, and can be accessible, for example, by a wired or wireless connection, or through an indirect connection such as through a computer network or communication network. For example, gateway node 310 can include a Serving Gateway (SGW) and/or a Packet Data Network Gateway (PGW), etc. One of ordinary skill in the art would recognize that gateway node 310 are not limited to any specific technology architecture, such as LTE, and can be used with any network architecture and/or protocol. Moreover, while two gateway node 310 are illustrated in FIG. 3 as being in communication with communication network 316 and wireless network 314, one of ordinary skill in the art would recognize that multiple gateway nodes could be in communication with communication network 316 and wireless network 314.

Gateway node 310 can comprise a processor and associated circuitry to execute or direct the execution of computer-readable instructions to obtain information. Gateway node 310 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 310 can receive instructions and other input at a user interface.

Controller node 312 can be any network node configured to communicate information and/or control information over system 300. Controller node 312 can be configured to transmit control information associated with a handover procedure. Controller node 312 can be a standalone computing device, computing system, or network component, and can be accessible, for example, by a wired or wireless connection, or through an indirect connection such as through a computer network or communication network. For example, controller node 312 can include a MME, a HSS, a PCRF, an AAA node, a RMS, a SPS, a policy server, etc. One of ordinary skill in the art would recognize that controller node 312 is not limited to any specific technology architecture, such as LTE and can be used with any network architecture and/or protocol. Moreover, while a single controller node 312 is illustrated in FIG. 3 as being in communication with communication network 316 and wireless network 314, one of ordinary skill in the art would recognize that multiple controller nodes could be in communication with network 316 and wireless network 314.

Controller node 312 can comprise a processor and associated circuitry to execute or direct the execution of computer-readable instructions to obtain information. Controller node 312 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller node 312 can receive instructions and other input at a user interface.

Although not shown for ease of illustration, access node 308 can be in communication with gateway node 310 and with controller node 312 through communication links. Gateway node 310 can be in communication with controller node 312, network 316, and/or wireless network 314 through communication links. The communication links can be wired or wireless links and use various communication protocols such as Internet, IP, LAN, optical networking, HFC, telephony, T1, or some other communication format—including combinations, improvements, or variations thereof. The links can be a radio frequency, microwave, infrared, or other similar signal, and can use a suitable communication protocol, for example, GSM, CDMA, WiMAX, or LTE, or combinations thereof. Other wireless protocols can also be used. The links can be a direct link or might include various equipment, intermediate components, systems, and networks.

Wireless (or communication) networks 314 and/or communication network 316 can be wired and/or wireless communication networks, and can comprise processing nodes, routers, gateways, and physical and/or wireless data links for carrying data among various network elements, including combinations thereof, and can include a LAN or WAN, and an internetwork (including the internet). Wireless network 314 and/or communication network 316 can be capable of carrying data, for example, to support voice, PTT, broadcast video, and data communications by a wireless device such as wireless devices 302, 304, and 306. Wireless network protocols can comprise MBMS, CDMA 1xRTT, GSM, UMTS, HSPA, EV-DO, EV-DO rev. A, 3GPP LTE, and WiMAX. Wired network protocols that may be utilized by wireless network 314 and/or communication network 316 comprise Ethernet, Fast Ethernet, Gigabit Ethernet, Local Talk (such as Carrier Sense Multiple Access with Collision Avoidance), Token Ring, FDDI, ATM. Wireless network 314 and/or communication network 316 can also comprise additional base stations, controller nodes, telephony switches, internet routers, network gateways, computer systems, communication links, or some other type of communication equipment, and combinations thereof.

Wireless devices 302, 304, and 306 can be configured as high power wireless devices or low power wireless devices. Wireless devices 302, 304, and 306 can use PHR and/or ePHR messages to report a current transmit power state or power headroom at access node 308; PHR and/or ePHR reporting at access node 308 can be periodic and/or event-triggered. Wireless devices 302, 304, and 306 can also report capacity/delay characteristic(s) or other channel quality metric(s) associated with data flows (or streams) transmitted to/from the wireless device 302, 304, and 306 at access node 308.

Access node 308 (and/or a scheduler at the access node) can select (or implement) any suitable scheduling algorithm (e.g., proportional fairness, data rate, or a hybrid). In an embodiment, access node 308 can collect and store a maximum allowable transmit power and/or data related to capacity/delay characteristics reported at the access node. Because access node 308 often schedules wireless resources among wireless devices 302, 304, and 306 without regard to (or irrespective of) the current transmit power state of the wireless devices, access node 308 may unduly choose (or favor) a high power wireless device (e.g. wireless device 302) reporting channel quality than a similarly situated low power or default power wireless device (e.g., wireless device 306). However, in some circumstances, wireless device 302 may provide negligible or little enhanced service to a user when receiving favorable treatment from access node 308, for instance when the wireless device comprises application requirements that would not substantially benefit from more robust resource grants and/or favorable scheduling. Accordingly, it may be beneficial, when certain network conditions arise, to offset the advantage that high power wireless devices gain from a scheduler.

Figure 4:
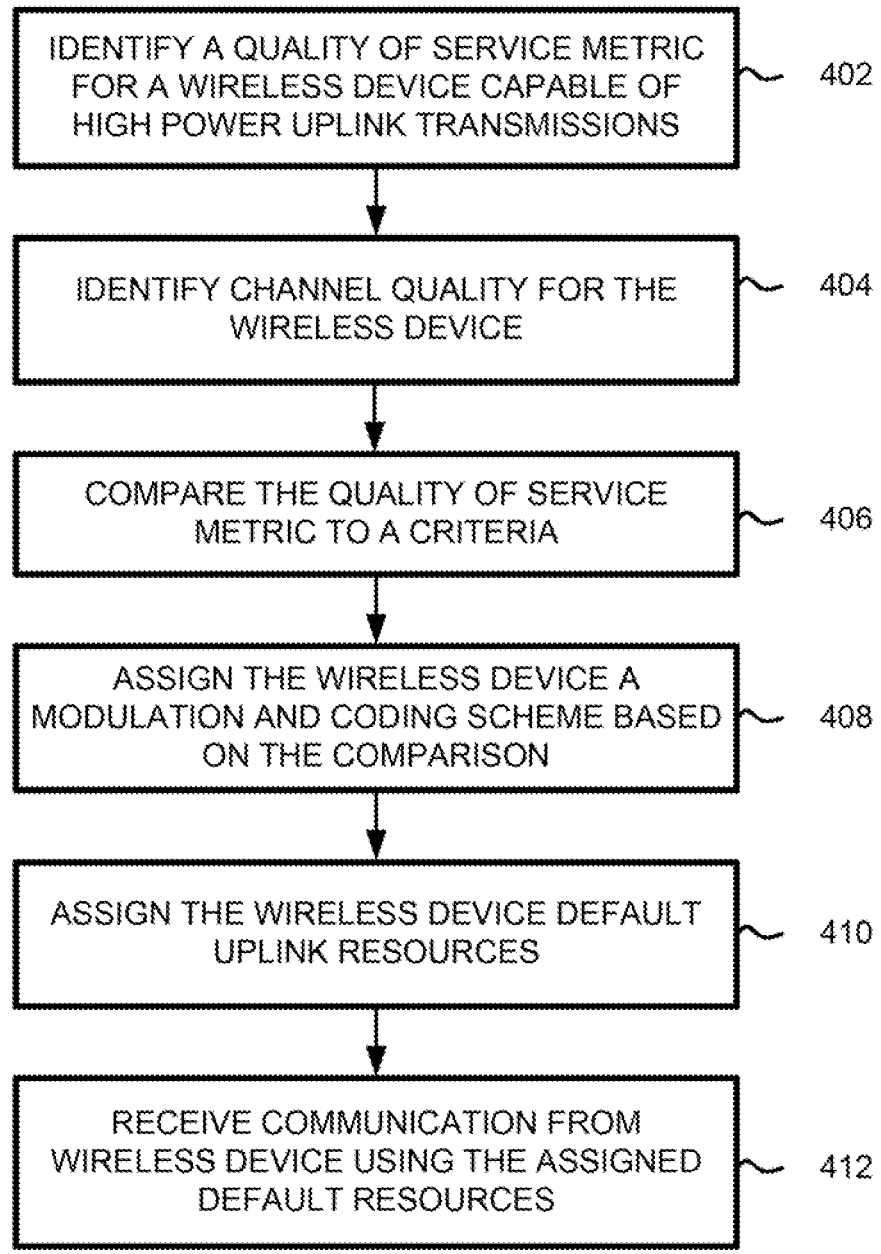
FIG. 4 illustrates another exemplary method for assigning wireless resources to a high power wireless device.

FIG. 4 illustrates another exemplary method for scheduling (or assigning) UL/DL transmissions from an access node in a wireless communication network. The method of FIG. 4 will be discussed with reference to the exemplary system 300 illustrated in FIG. 3 and the exemplary power class range(s) of high power wireless devices and default and/or other currently deployed low power wireless devices illustrated in FIG. 1A. But, the exemplary method for scheduling UL/DL transmissions illustrated in FIG. 4 can be implemented with any suitable communication system. In addition, although FIG. 4 depicts steps performed in a particular order or arrangement. One skilled in the art, using the disclosure provided herein, will appreciate that various steps of the method can be omitted, rearranged, combined, and/or adapted in various ways.

Referring to FIG. 4, at 402, a quality of service metric used for communication between a wireless device and an access node may be identified, wherein the wireless device is configured to transmit an uplink signal at a first signal level that meets a power criteria. For example, wireless device 302 may comprise a high power wireless device (e.g., device class 1 or 2) such that the wireless device is capable of transmitting a signal (e.g., uplink signal) at a signal level (e.g., 31 dB or 26 dB) that meets a power criteria. In an embodiment, a quality of service metric for the communication between wireless device 302 and access node 308 may be determined.

In an embodiment, wireless devices 302, 304, and 306 may comprise one or more quality of service metrics (e.g., QCIs) for communication with access node 308. For example, quality of services metric may comprise an application requirement for communication between a wireless device and an access node, such as a QCI, a minimum guaranteed bit rate (GBR), maximum bit rate (MBR), a priority, a minimum bit rate, a maximum permitted data delay, a minimum throughput, a maximum error rate, a maximum data loss rate, and any other suitable application requirement.

In an embodiment, the quality of service metric may be a particular QCI or a set of QCIs associated with particular services. For example, in an implementation that leverages LTE, a QCI table may map particular QCIs (e.g., 1, 2, 3, 4, and the like) to a set of service requirements. In some examples, QCI 1, QCI 5, or any other QCI suitable metric may comprise a set of services requirements that provide voice services to a wireless device. Thus, the quality of service metrics for wireless devices 302, 304, and 306 (e.g., QCIs) may indicate that the wireless devices are executing or initiating a VoIP or VoLTE voice call. Other predetermined QCIs may indicate other data services for a wireless device (e.g., streaming video, web page browsing, best efforts data services, and the like). In other embodiments, other wireless services, quality of service criteria, and QCIs may be implemented.

At 404, a channel quality may be identified for the wireless device. For example, a channel quality for communication between wireless device 302 and access node 308 may be identified. Wireless device 302 may report a channel quality indicator (CQI) to access node 308 that indicates the channel quality for the wireless device relative to the access node. For example, the reported channel quality may comprise a value (e.g., between 0 and 15) that indicates the channel quality for the wireless device. The identified channel quality may comprise the reported CQI.

In other embodiments, the identified channel quality may be based on other suitable metrics. For example, the identified channel quality may be based on a received signal level (e.g., SINR, RSRP, or the like) for a signal received at wireless device 302 from access node 308, such as a reference signal or pilot signal.

In some embodiments, wireless device 302 also reports a PHR or ePHR report to access node 308 that indicates the power headroom or transmit power available to the wireless device. For example, a PHR report may comprise a power head room value (e.g., between 0 and 63), where the reported value corresponds to a power range (e.g., 0 corresponds to −23 dB<=PH>=−22 dB, 1 corresponds to −22 dB<=PH>=−21 dB, . . . 62 corresponds to 39 dB<=PH>=40 dB, and 63 corresponds to PH>=40 dB). Power headroom and/or CQI reporting to access nodes 308 can be periodic and/or event-triggered. Wireless device 302 can also report capacity/delay characteristic(s) associated with data flows transmitted to/from the wireless device at access node 308.

At 406, the quality of service metric may be compared to a quality of service criteria. For example, the identified quality of service metric (e.g., QCI) for wireless device 302 may be compared to a quality of service criteria. In an embodiment, the quality of service criteria may comprise a predetermined set of QCIs, a minimum data rate, a maximum latency, and maximum error rate, a combination of these, and any other suitable criteria.

For example, where the identified quality of service metric comprises a QCI, it may be determined whether the identified QCI is within a set of predetermined QCIs. When the identified QCI is within the set of predetermined QCIs, the identification application requirements are determined to meet the quality of service criteria. When the identified QCI is not within the set of predetermined QCIs, the identification application requirements are determined to not meet the quality of service criteria. The predetermined QCIs may be a set of QCIs associated with one or more data services (e.g., streaming video, high data rate QCIs, and the like) or a set of QCIs associated with minimum data rates above a threshold.

In an embodiment, one or more QCIs associated with voice service, VoLTE services, or heavy data users (i.e., users with data usage above a threshold) may be excluded from the predetermine set of QCIs. For example, a wireless device with a quality of service metric associated with voice services may not meet the quality of service criteria. Similarly, a wireless device with a quality of service metric for users with a data usage above a threshold, or heavy data users (e.g., over 3 GBs, over 6 GBs, or 10 GBs, and the like) may not meet the quality of service criteria. Data usage for users may be accessed from a home subscriber server (HSS), or other suitable network node that stores user account information.

At 408, a default modulation and coding scheme may be assigned to the wireless device based on the identified quality of service metric. For example, it may be determined that the identified quality of service metric for wireless device 302 fails to meet the quality of service criteria, and a default modulation and coding scheme (MCS) may be assigned to the wireless device.

For example, access node 308 may assign wireless device 302 a MCS (e.g., QPSK, QAM16, QAM64, and the like) for communicating with the access node. When the identified quality of service metric for wireless device 302 fails to meet the quality of service criteria, it may indicate that the wireless device should be treated like a default wireless device due to limited service benefit of a higher transmit power for wireless devices that fail to meet the quality of service metric criteria.

In some embodiments, wireless device 302 is assigned a default MCS by reducing a channel quality indicator reported to access node 308 used to assign the wireless device an MCS. For example, in an LTE implementation, a table may be used to map reported CQIs to an assigned MCS (e.g., CQI of 1 corresponds to QPSK, CQI of 7 corresponds to 16QAM, CQI of 10 corresponds to 64QAM, and the like). Based on the power class for wireless device 302 and the transmit power associated with the power class (e.g., +1 dB, +3 dB), the CQI value reported may be reduced in accordance with the increased transmit power (e.g., subtract 1, 2, or 3 for a +1 dB, subtract 3, 4, or 5 for a +3 dB, and the like). For example, a reported CQI of 10 for a wireless device with a +3 dB transmit power may be reduced by 4, resulting in a reduced CQI of 6. In this example, a CQI of 10 corresponds to a 64QAM MCS, however after reduction the CQI of 6 corresponds to a 16QAM. The reduction in the reported CQI aims to treat the high power wireless device as a default wireless device, and thus compensates for the increased channel quality caused by the increased transmission power for the high power wireless device. In other words, a high power wireless device that comprises a quality of service metric that fails to meet the quality of service criteria may be assigned a default MCS by reducing the CQI reported by the high power wireless device when assigning the MCS.

At 410, default uplink resources may be assigned to the wireless device based on the identified quality of service criteria, wherein the default uplink resources are associated with a default wireless device configured to transmit an uplink signal at a second signal level that does not meet the power criteria. For example, based on the identified quality of service metric, access node 308 may assign uplink wireless resources to wireless device 302 as if the wireless device were a default wireless device that did not have the capability to transmit an uplink signal at a signal level that meets the criteria (e.g., as if the wireless device were a default wireless device rather than a high power wireless device).

For example, when the identified quality of service metric (e.g., QCI) fails to meet the quality of service metric criteria (e.g., predetermined set of QCIs), a power head room and/or channel quality reported by wireless device 302 may be offset (reduced) such that access node 308 assigns uplink resources to the wireless device as if it were a default wireless device (e.g., reporting a lower CQI and/or PHR).

In an embodiment, a scheduler for access node 308 may comprise a scheduling algorithm (e.g., proportional fairness, round robin, data rate, and the like) that assigns resource blocks for uplink transmissions to wireless device 302 based on, among other information, the identified quality of service metric, a reported CQI, and an assigned MCS. In some embodiments, when the identified quality of service metric fails to meet the criteria, a reduced CQI can be used to assign a default MCS, and the scheduling algorithm assigns default resource blocks based on the reduced CQI and default MCS (rather than the reported CQI and corresponding MCS). For example, the reported CQI value may be reduced by an offset depending on the power class for wireless device 302 (e.g., reduced by 1, 2, 3, 4, 5, or the like), and the resultant MCS corresponding to the reduced CQI may comprise a default MCS. In this example, the reduction in the reported CQI and default MCS aims to treat the high power wireless device as a default wireless device, and thus compensates for the increased channel quality caused by the increased transmission power for the high power wireless device. The resultant resource blocks assigned based on the reduced CQI and default MCS may comprise default uplink resources (e.g., a reduced number of resource blocks for uplink transmissions than would be assigned if the reported CQI and corresponding MCS were used to schedule uplink resources).

In an embodiment, a scheduler for access node 308 may comprise a scheduling algorithm that assigns resource blocks for uplink transmissions to wireless device 302 based on, among other information, the identified quality of service metric, a reported CQI, an assigned MCS, and a reported PHR. In this example, and similar to the reduction to CQI, when the identified quality of service metric fails to meet the quality of service criteria, the reported PHR may be reduced in accordance with a power class for wireless device 302 (e.g., +1 db corresponds to a 1 dB reduction, +3 dB corresponds to a 3 dB reduction). In some embodiments, the scheduling algorithm assigns default resource blocks based on the reduced CQI, the corresponding default MCS, and the reduced PHR (rather than the reported CQI, the corresponding MCS, and the reported PHR). In this embodiment, the reduction in the reported CQI, PHR, and default MCS aims to treat the high power wireless device as a default wireless device, and thus compensates for the increased channel quality caused by the increased transmission power for the high power wireless device. The resultant resource blocks assigned based on the reduced CQI, default MCS, and reduced PHR may comprise default uplink resources (e.g., a reduced number of resource blocks for uplink transmission than would be assigned if the reported CQI, reported PHR, and corresponding MCS were used to schedule uplink resources).

At 412, uplink communication may be received at the access node from the wireless device using the assigned default uplink resources. For example, wireless device 302 may transmit uplink signals using the assigned default uplink resources, and the signals may be received at access node 308. In some example, wireless device 302 may use an increased uplink transmission signal power in accordance with the power class for the wireless device to transmit uplink signals using the assigned default uplink resources.

Figure 5:
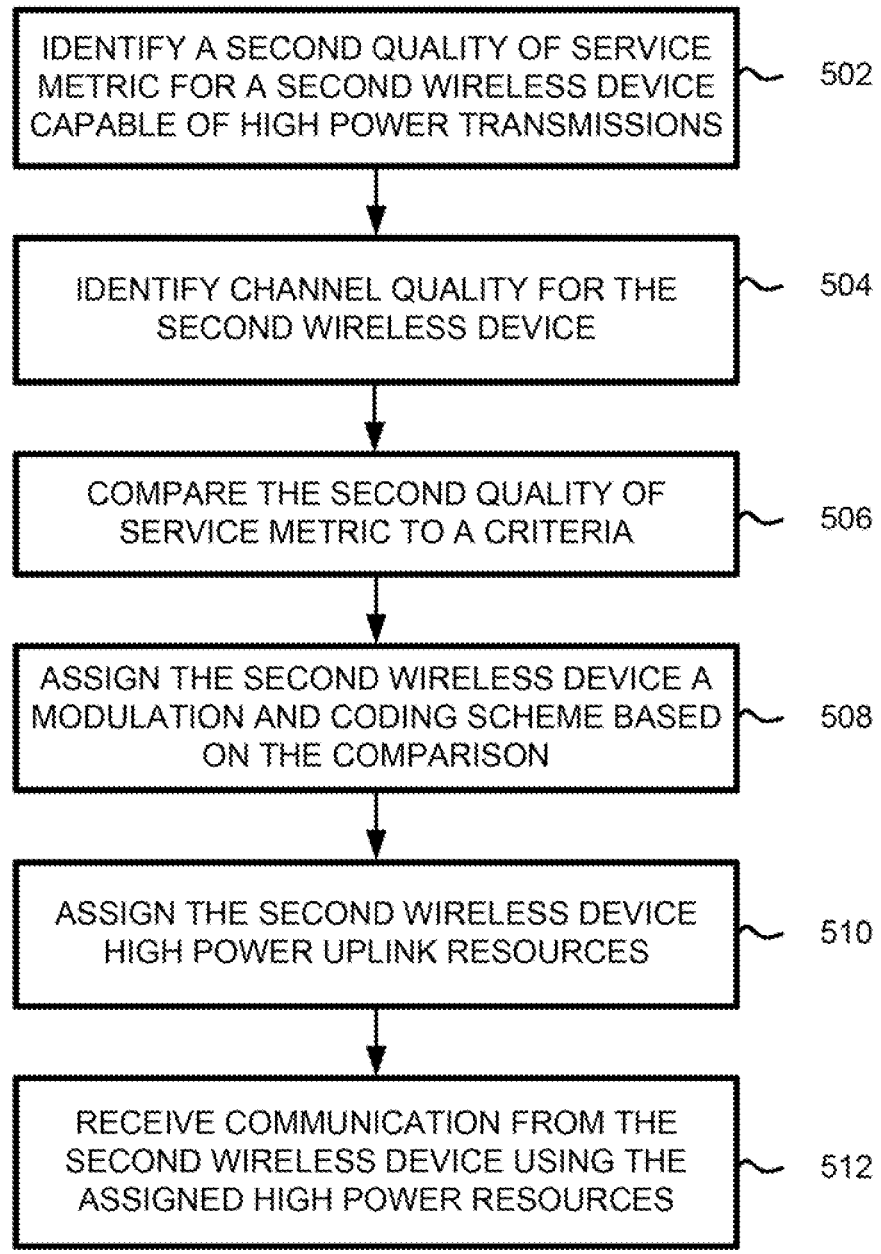
FIG. 5 illustrates another exemplary method for assigning wireless resources to a high power wireless device.

FIG. 5 illustrates another exemplary method for scheduling (or assigning) UL/DL uplink resources for high power wireless device. The method of FIG. 5 will be discussed with reference to the exemplary system 300 illustrated in FIG. 3 and the exemplary power class range(s) of high power wireless devices and default and/or other currently deployed low power wireless devices illustrated in FIG. 1A. But, the exemplary method for scheduling UL/DL transmissions illustrated in FIG. 5 can be implemented with any suitable communication system. In some embodiments, the method of FIG. 5 may be performed after the method of FIG. 4. In addition, although FIG. 5 depicts steps performed in a particular order or arrangement. One skilled in the art, using the disclosure provided herein, will appreciate that various steps of the method can be omitted, rearranged, combined, and/or adapted in various ways.

Referring to FIG. 5, at 502, a quality of service metric used for communication between a second wireless device and the access node may be identified, wherein the second wireless device is configured to transmit an uplink signal at a first signal level that meets a power criteria. For example, wireless device 304 may comprise a high power wireless device (e.g., device class 1 or 2) such that the wireless device is capable of transmitting a signal (e.g., uplink signal) at a signal level (e.g., 31 dB or 26 dB) that meets a power criteria. In an embodiment, a quality of service metric for the communication between wireless device 304 and access node 308 may be determined. In some embodiments, the quality of service metric may comprise a QCI or any other suitable quality of service metric.

At 504, a channel quality may be identified for the second wireless device. For example, a channel quality for communication between wireless device 304 and access node 308 may be identified. Wireless device 304 may report a channel quality indicator (CQI) to access node 308 that indicates the channel quality for the wireless device relative to the access node. For example, the reported channel quality may comprise a value (e.g., between 0 and 15) that indicates the channel quality for the wireless device. The identified channel quality may comprise the reported CQI. In some embodiments, wireless device 304 also reports a PHR or ePHR report to access node 308 that indicates the power headroom or transmit power available to the wireless device. Wireless device 304 can also report capacity/delay characteristic(s) associated with data flows transmitted to/from the wireless device at access node 308.

At 506, the identified quality of service metric for the second wireless device may be compared to a quality of service criteria. For example, the identified quality of service metric (e.g., QCI) for wireless device 304 may be compared to a quality of service criteria. In an embodiment, the quality of service criteria may comprise a predetermined set of QCIs, a minimum data rate, a maximum latency, and maximum error rate, a combination of these, and any other suitable criteria.

For example, where the identified quality of service metric comprises a QCI, it may be determined whether the identified QCI is within a set of predetermined QCIs. When the identified QCI is within the set of predetermined QCIs, the identification application requirements are determined to meet the quality of service criteria. When the identified QCI is not within the set of predetermined QCIs, the identification application requirements are determined to not meet the quality of service criteria.

At 508, a modulation and coding scheme may be assigned to the second wireless device based on the identified quality of service metric. For example, it may be determined that the identified quality of service metric for wireless device 304 meets the quality of service criteria, and a resultant modulation and coding scheme (MCS) may be assigned to the wireless device.

For example, access node 308 may assign wireless device 304 a MCS (e.g., QPSK, QAM16, QAM64, and the like) for communicating with the access node. When the identified quality of service metric for wireless device 304 meets the quality of service criteria, the wireless device may be assigned an MCS that benefits from the power class of the wireless device. For example, a reported CQI of 10 for wireless device 304 corresponds to a 64QAM MCS, and the wireless device may be assigned this high power MCS when the identified quality of service metric for the wireless device meets the quality of service criteria. A high power wireless device that comprises a quality of service metric that meets the quality of service criteria may be assigned a high power MCS based on the higher transmit power for the wireless device because the wireless device stands to provide enhanced service.

At 510, uplink resources may be assigned to the wireless device based on the identified quality of service criteria, wherein the uplink resources are associated with a wireless device configured to transmit an uplink signal at a first signal level that meets the power criteria. For example, based on the identified quality of service metric, access node 308 may assign uplink wireless resources to wireless device 304 based on the increased transmit power for the wireless device.

In an embodiment, a scheduler for access node 308 may comprise a scheduling algorithm (e.g., proportional fairness, round robin, data rate, and the like) that assigns resource blocks for uplink transmissions to wireless device 304 based on, among other information, the identified quality of service metric, a reported CQI, and an assigned MCS. In another embodiment, a scheduler for access node 308 may comprise a scheduling algorithm that assigns resource blocks for uplink transmissions to wireless device 304 based on, among other information, the identified quality of service metric, a reported CQI, an assigned MCS, and a reported PHR. Because wireless device 304 comprises a high power wireless device, the increased transmit power corresponds to a higher reported CQI, high power MCS, and higher PHR, and a greater quantity of uplink resources (e.g., uplink resource blocks) can be scheduled for wireless device 304 based on the higher reported CQI, high power MCS, and/or higher PHR. In some embodiments, because wireless device 304 comprises a quality of service metric that meets the quality of service criteria, the wireless device may be assigned a higher quantity of uplink resources (e.g., higher number of resource blocks) than wireless device 302 (which comprises a quality of service metric that does not meet the quality of service criteria), even when the wireless devices otherwise comprise similar channel conditions. In other words, wireless device 304 may be scheduled uplink resources associated with a high power wireless device and wireless device 302 may be scheduled uplink resources associated with a default wireless device.

At 512, uplink communication may be received at the access node from the second wireless device using the assigned uplink resources. For example, wireless device 304 may transmit uplink signals using the assigned uplink resources, and the signals may be received at access node 308. In some example, wireless device 304 may use an increased uplink transmission signal power in accordance with the power class for the wireless device to transmit uplink signals using the assigned uplink resources.

Referring back to FIG. 4, in some embodiments the quality of service metric for communication between wireless device 302 and access node 308 may change. For example, an updated quality of service metric may be identified for wireless device 302 at a second time after performance of the method of FIG. 4 that meets the quality of service criteria. In this example, the assigned MCS and scheduling for wireless device 302 may change such that the wireless device can benefit from the increased transmit power associated with a high power wireless device. For example, wireless device 302 may be assigned an MCS and uplink resources in a manner similar to that described for wireless device 304. In other worlds, the quantity of uplink resources assigned to wireless device 302 may increase (e.g., from a default amount of uplink resources to an amount of uplink resources associated with a high power wireless device).

One skilled in the art, using the disclosure provided herein, will appreciate that various steps of the methods can be omitted, rearranged, combined and/or adapted in various ways and can be completed by multiple wireless devices and access nodes.

Figure 6:
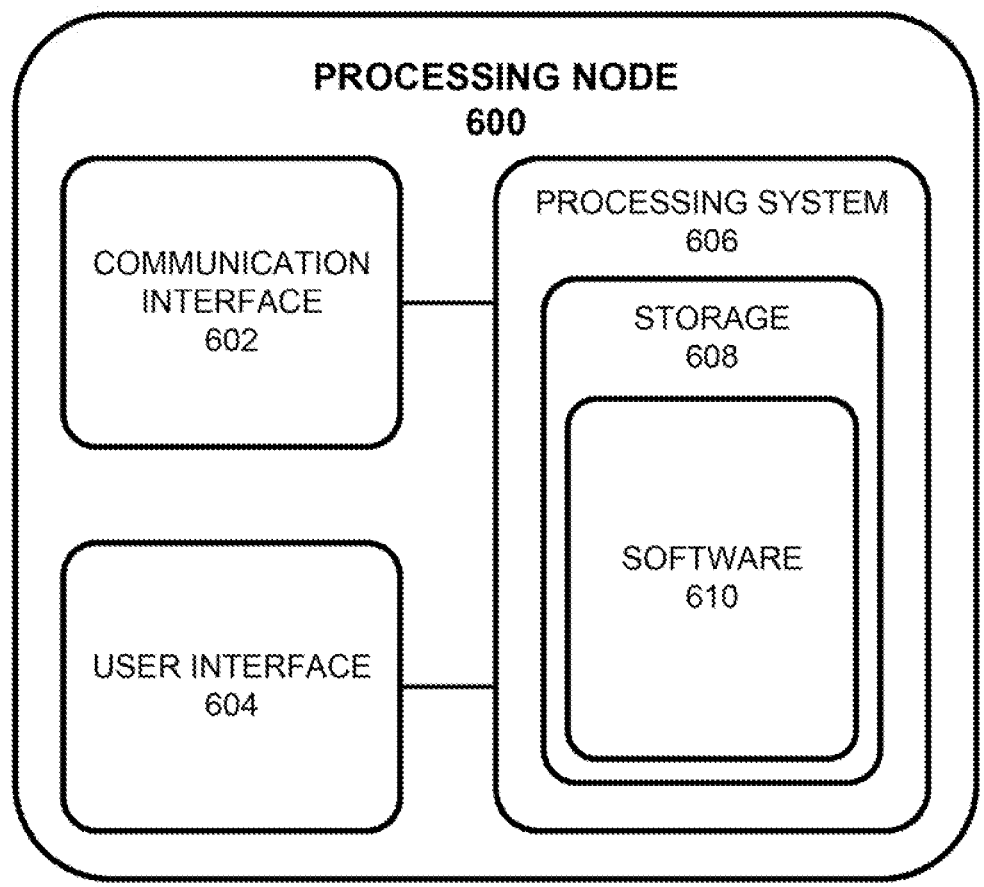
FIG. 6 illustrates an exemplary processing node.

FIG. 6 illustrates an exemplary processing node 600 in a communication system. Processing node 600 comprises communication interface 602, user interface 604, and processing system 606 in communication with communication interface 602 and user interface 604. Processing node 600 can be configured to determine a communication access node for a wireless device. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include access nodes 106, 106A, 106B, scheduler node 108, network node 112, gateway node 310, and controller node 314. Processing node 600 can also be an adjunct or component of a network element, such as an element of access nodes 106, 106A, 106B, scheduler node 108, network node 112, gateway node 310, and controller node 312. Processing node 600 can also be another network element in a communication system. Further, the functionality of processing node 600 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for assigning uplink resources for high power wireless devices, the method comprising:
  determining, by an access node, that a quality of service metric used for communication between a wireless device and the access node is not associated with a first service, wherein the quality of service metric comprises a quality of service class indicator (QCI);

determining, by the access node, that the wireless device is configured to transmit an uplink signal at a first power level that is higher than a default power level;

responsive to determining that the quality of service metric is not associated with the first service and that the wireless device is configured to transmit at the first power level, reducing, by the access node, a channel quality reported by the wireless device to the access node, wherein the channel quality is reduced by an offset amount based on the first power level, and wherein reducing the channel quality causes a default modulation and coding scheme (MCS) to be assigned to the wireless device, wherein the default MCS is associated with the default power level, and the default MCS is lower than a first MCS associated with the first power level; and receiving, at the access node, uplink communication from the wireless device using the assigned default MCS.

2. The method of claim 1, wherein the QCI is for a data bearer used for communication between the wireless device and the access node.

3. The method of claim 2, wherein the first service comprises voice data.

4. The method of claim 2, wherein the QCI is associated with heavy data users.

5. The method of claim 1, further comprising:
determining that a second quality of service metric used for communication between a second wireless device and the access node is associated with the first service;
determining that the second wireless device is configured to transmit an uplink signal at the first power level; and
responsive to determining that the second quality of service metric is associated with the first service and that the second wireless device is configured to transmit at the first power level, assigning the first MCS to the second wireless device.

6. The method of claim 5, further comprising:
identifying a second channel quality reported to the access node by the second wireless device; and
determining the first MCS for the second wireless device based on the second channel quality.

7. A system for assigning uplink resources for high power wireless devices, the system comprising:
an access node configured to:
determine that a quality of service metric used for communication between a wireless device and an access node is not associated with a first service, wherein the quality of service metric comprises a quality of service class indicator (QCI);
determine that the wireless device is configured to transmit an uplink signal at a first power level that is higher than a default power level;
responsive to determining that the quality of service metric is not associated with the first service and that the wireless device is configured to transmit at the first power level, reduce a channel quality reported by the wireless device to the access node, wherein the channel quality is reduced by an offset amount based on the first power level, and wherein reducing the channel quality causes a default modulation and coding scheme (MCS) to be assigned to the wireless device, wherein the default MCS is associated with the default power level, and the default MCS is lower than a first MCS associated with the first power level; and
receive, at the access node, uplink communication from the wireless device using the assigned default MCS.

* * * * *